United States Patent
Denis et al.

(10) Patent No.: US 9,204,253 B2
(45) Date of Patent: Dec. 1, 2015

(54) RSS BASED POSITIONING METHOD WITH LIMITED SENSITIVITY RECEIVER

(71) Applicant: Commissariat a l' energie atomique et aux ene alt, Paris (FR)

(72) Inventors: Benoit Denis, Grenoble (FR); Laurent Ouvry, Grenoble (FR)

(73) Assignee: Commissariat á l'énergie atomique et aux énergies alternatives, Paris (FR)

( * ) Notice: Subject to any disclaimer, the term of this patent is extended or adjusted under 35 U.S.C. 154(b) by 70 days.

(21) Appl. No.: 14/352,535

(22) PCT Filed: Oct. 16, 2012

(86) PCT No.: PCT/EP2012/070494
§ 371 (c)(1),
(2) Date: Apr. 17, 2014

(87) PCT Pub. No.: WO2013/057106
PCT Pub. Date: Apr. 25, 2013

(65) Prior Publication Data
US 2014/0243016 A1    Aug. 28, 2014

(30) Foreign Application Priority Data
Oct. 17, 2011  (EP) ..................................... 11290481

(51) Int. Cl.
*H04W 4/02* (2009.01)
*G01S 5/02* (2010.01)
*G01S 5/14* (2006.01)

(52) U.S. Cl.
CPC ................. *H04W 4/02* (2013.01); *G01S 5/021* (2013.01); *G01S 5/0221* (2013.01); *G01S 5/0289* (2013.01); *G01S 5/14* (2013.01)

(58) Field of Classification Search
CPC .... H04W 64/00; H04W 64/003; G01S 5/021; G01S 5/0221; G01S 5/0252; G01S 5/10; G01S 5/14; G01S 11/06; G01S 13/878; G01S 5/0278; G01S 5/0289
See application file for complete search history.

(56) References Cited

U.S. PATENT DOCUMENTS

| | | |
|---|---|---|
| 2008/0232281 A1 | 9/2008 | Pahlavan et al. |
| 2011/0074569 A1 | 3/2011 | Alsindi et al. |
| 2011/0074634 A1 | 3/2011 | Yeo et al. |

(Continued)

OTHER PUBLICATIONS

Deng, Z., et al., "Localization algorithm based on difference estimation for wireless sensor networks in Pervasive Computing Environment", IEEE, pp. 479-484, (2008) XP 31424972.

(Continued)

*Primary Examiner* — Nam Huynh
(74) *Attorney, Agent, or Firm* — Oblon, McClelland, Maier & Neustadt, L.L.P.

(57) ABSTRACT

A method for positioning a node within a wireless sensor network in which each node measures RSSs from its neighboring nodes. Path loss parameters of a channel between a regular node and a neighboring node are first obtained. Distances separating each regular node from its neighboring nodes are then estimated on the basis of the measured RSSs, the allocated path loss parameters. Each distance estimate is further corrected by a systematic bias depending upon the actual sensitivity of the receiver. The positions of the regular nodes are estimated from the distance estimates thus corrected.

11 Claims, 4 Drawing Sheets

(56) References Cited

U.S. PATENT DOCUMENTS

2011/0102265 A1* 5/2011 Jiang .................. G01S 5/12
342/398
2012/0077513 A1* 3/2012 Rizzello .................. G01S 5/14
455/456.1

OTHER PUBLICATIONS

Chen, Y., et al., "On the Mechanisms and Effects of Calibrating RSSI Measurements for 802.15.4 Radios", LNCS, vol. 5970, pp. 256-271, (2010) XP 19138696.
Niculescu, D., et al., "Ad Hoc Positioning Systems (APS)", IEEE, pp. 2926-2931, (2001) XP 10747393.
Laaraiedh., M., et al., "Enhancing positioning accuracy through direct position estimators based on hybrid RSS data fusion", IEEE, pp. 1-5, (2009) XP 31474486.
Ihler, T., et al., "Nonparametric Belief Propagation for Self-Localization of Sensor Networks", IEEE Journal on Selected Areas in Communications, vol. 23, No. 4, pp. 809-819, (Apr. 2005) XP 11129424.
Mensing, C., et al., "Centralized Cooperative Positioning and Tracking with Realistic Communications Constraints", IEEE, pp. 215-223, (2010) XP 31813395.
European Search Report Issued May 15, 2012 in Application No. EP 11 29 0481 Issued Oct. 17, 2011.
International Search Report Issued Dec. 13, 2012 in PCT/EP12/070494 Filed Oct. 16, 2012.
U.S. Appl. No. 14/351,971, filed Apr. 15, 2014, Denis, et al.
U.S. Appl. No. 14/349,903, filed Apr. 4, 2014, Denis, et al.
U.S. Appl. No. 14/435,370, filed Apr. 13, 2015, Dehmas, et al.
U.S. Appl. No. 14/435,283, filed Apr. 13, 2015, Dehmas, et al.
U.S. Appl. No. 14/435,338, filed Apr. 13, 2015, Ouvry, et al.
U.S. Appl. No. 14/739,072, filed Jun. 15, 2015, Dehmas, et al.

* cited by examiner

RSS BASED POSITIONING METHOD WITH LIMITED SENSITIVITY RECEIVER

TECHNICAL FIELD

The present application relates to a positioning method and particularly applies to the positioning of nodes in a Wireless Sensor Networks (WSN).

PRIOR ART

Wireless Sensor Networks (WSNs) can be applied to various areas such as military affairs, commerce, medical care, environment monitoring and have been a subject of intensive research over the last few years. In a wireless sensor network (WSN), data collected by the nodes (sensors) are typically collected and processed by one or more controlling nodes. In many applications (e.g. environment monitoring), processing of the data cannot be performed without knowing the respective positions of the nodes these data are collected from.

Many positioning algorithms have been proposed in the prior art to determine the location of nodes in a WSN. These algorithms generally assume that the position of certain nodes, also called anchor nodes or landmarks, have an a priori knowledge of their coordinates, e.g. by GPS positioning. The (absolute) positions of the other nodes, also called regular nodes, are then inferred from the positions of the anchor nodes.

Basically, positioning algorithms for WSNs fall into two categories: range-free and range-based.

Range-free positioning algorithms approximate the distances of the regular nodes to the anchor nodes on the basis of connectivity information. Representatives of range-free positioning algorithms are DV-Hop, amorphous, and centroid algorithms. For example a description of the DV-Hop algorithm can be found in the article of D. Niculescu et al. entitled "Ad Hoc positioning system" published in Proc. of Global Telecommunications Conference, 2001, GLOBECOM '01, San Antonio, Tex., USA, pp. 2926-2931. Basically, in DV-Hop each regular node determines its shortest path (in terms of number of hops) to a sufficient number of anchors. Similarly, each anchor node broadcasts its position and determines its shortest path (again, in terms of number of hops) to the remaining anchor nodes. Once an anchor node has determined its shortest paths to all the other anchor nodes, it calculates the average hop size as the ratio of distances and number of hops to all the other anchor nodes. Each regular node can then simply obtain a rough estimate of a distance to an anchor node by multiplying the number of hops to this node with the average hop size. Once the distances to three anchor nodes have been estimated, a coarse position of the node can be obtained by conventional trilateration.

Range-based positioning algorithms obtain point-to-point distance information between neighboring nodes and derive then the location of the regular nodes. A range-based positioning algorithm, known as the WLS algorithm, is described in the article of M. Laaraiedh et al. entitled "Enhancing positioning accuracy through direct position estimators based on hybrid RSS data fusion" published in Proc. IEEE VTC '09, Spring Barcelona, Spain. According to this non-cooperative algorithm, the ranges between regular mobile nodes and anchors are estimated from received signal strength (RSS) observables. Once a regular node has measured a minimum number of observables, it may estimate the ranges to some of the anchor nodes. The coordinates of the regular node are determined as a weighted least square (WLS) solution of an over-determined set of equations, the weighting being relying e.g. on the covariance matrix of range estimates.

FIG. 1 schematically illustrates a known wireless sensor network to which the node positioning method according to the invention can be applied.

The illustrated wireless sensor network comprises N nodes spatially distributed in a bi-dimensional area, including:

$N_a$ anchor nodes, 110, with known locations, one of them possibly playing the role of a network controller or coordinator (NC), the other anchors being either fixed routers or simple end-devices with augmented capabilities (e.g. GPS-enabled nodes), and $N_r$ regular nodes, 120, to be positioned.

The lines 130 represent radio-links between neighboring nodes. Assuming that each node is capable of measuring the signal strength of a signal transmitted by another node, the one-hop neighborhood of a node i is the set of nodes defined as:

$$H(i)=\{j|P_{Rx,ij}<P_{th}\} \quad (1)$$

where $P_{Rx,ij}$ denotes the strength of the signal received by node i from node j and $P_{th}$ is the detection threshold of the receiver (supposed here to be identical for all the nodes). The nodes are indexed by i=1, . . . , N, where without loss of generality, the $N_a$ anchor nodes are assumed to bear the first indices i=1, . . . , $N_a$, and the regular nodes to bear the last indices i=$N_a$+1, . . . , N (N=$N_a$+$N_r$).

Next, the WLS node positioning algorithm will be briefly described.

It is recalled that the path loss over a radio link between two neighboring nodes i and j can be modeled as follows:

$$PL(d)=PL_0+10\alpha \log_{10}(d/d_0) \quad (2)$$

where $PL_0=20 \log_{10}(4\pi f_c d_0/c)$ is the path loss experienced by the radio signal at a reference distance $d_0$, d is the distance between the two nodes, $f_c$ is the carrier frequency of the radio signal, c is the speed of light, and $\alpha$ is the path loss decay exponent.

The path loss decay exponent basically depends upon the type of environment. For example $\alpha=2$ for a line of sight (LOS) configuration in free space but has a higher value in obstructed environments.

In fact, expression (2) only represents the average path loss at the distance d. The measured received signal strength actually varies about an average value that depends on the average path loss and the transmit power, according to a zero-mean Gaussian random variable accounting for shadowing. Shadowing is a fluctuation of the attenuation due to the presence of obstacles between the transmitter and the receiver. More specifically, shadowing encompasses absorption, reflection, scattering and diffraction by these obstacles. In other words, the strength of the signal received by a node from a neighboring one can be expressed as:

$$P_{Rx}(d)=P_{Tx}+G_{Tx}G_{Rx}-PL(d)+z=\overline{P_{Rx}(d)}+z \quad (3)$$

where $P_{Rx}(d)$ is the strength of the received signal at the distance d, $P_{Tx}$ is the power of transmitted signal (expressed e.g. in dBm), $G_{Tx}$ and $G_{Rx}$ are respectively the antenna gains of the transmitter and the receiver (expressed in dBi or dB), z is the above-mentioned Gaussian variable having a variance $\sigma_z^2$, and $\overline{P_{Rx}(d)}$ is the average received strength at the distance d (the average being taken over the shadowing instances).

The variance $\sigma_z^2$, also called shadowing coefficient, practically depends on the type of environment in which the network is located.

For a given received signal strength $P_{Rx,ij}$ measured by the receiver of node i, the distance $d_{ij}$ between the nodes i and j can be estimated from (2) and (3), e.g. by the median estimator:

$$\tilde{d}_{ij}^{med} = \exp(M_{ij}) \quad (4)$$

with $$M_{ij} = \frac{([P_{Tx} + G_{Rx} + G_{Tx} - P_{Rx,ij}] - PL_0)\log(10)}{10\alpha_{ij}} + \log(d_0)$$

and where the distance estimate $\tilde{d}^{med}$ and the path loss decay coefficient $\alpha$ have been indexed here by i,j in order to emphasize their dependence upon the link considered between nodes i and j.

Alternate estimators can be used as indicated in the article from M. Laaraiedh et al., e.g. the mean estimator, also referred to as the LS (Least Squares) estimator, or the mode estimator, also referred to as the ML (Maximum Likelihood) estimator:

$$\tilde{d}_{ij}^{LS} = \exp\left(M_{ij} + \frac{S_{ij}^2}{2}\right) \quad (4')$$

$$\tilde{d}_{ij}^{ML} = \exp(M_{ij} - S_{ij}^2) \quad (4'')$$

with $$S_{ij} = \frac{\sigma_{z,ij}\ln 10}{10\alpha_{ij}},$$

where $\sigma_{z,ij}$ is the shadowing coefficient associated with the channel configuration $C_{ij}$ between nodes i and j. $\tilde{d}_{ij}^{LS}$ and $\tilde{d}_{ij}^{ML}$ respectively denote the estimate of distance $d_{ij}$ provided by the LS and the ML estimators.

Furthermore, the respective variances of these distance estimators can equally be obtained from the values $S_{ij}$ and $M_{ij}$:

$$(\tilde{\sigma}_{d,ij}^{med})^2 = (\tilde{d}_{ij}^{med})^2 e^{S_{ij}^2}(e^{S_{ij}^2}-1) \quad (5)$$

$$(\tilde{\sigma}_{d,ij}^{LS})^2 = (\tilde{d}_{ij}^{LS})^2 e^{2S_{ij}^2}(e^{S_{ij}^2}-1) \quad (5')$$

$$(\tilde{\sigma}_{d,ij}^{ML})^2 = (\tilde{d}_{ij}^{ML})^2 (1-e^{-S_{ij}^2}) \quad (5'')$$

Once all the distances between neighboring nodes have been estimated, and the variances of the distance estimators calculated, the coordinates of the regular nodes may be obtained by a range-based positioning algorithm. Numerous range-based positioning algorithms are able to derive the positions of the nodes from the distance estimates $\tilde{d}_{ij}$.

One of these algorithms is based on WLS optimization. More specifically, if we denote $X=(x_{Na+1}, \ldots x_N)$ and $Y=(y_{Na+1}, \ldots, y_N)$ the abscissas and the ordinates of the regular nodes, the coordinates of these nodes can be estimated by minimizing the quadratic cost function, following a centralized approach:

$$(\hat{X}^{WLS}, \hat{Y}^{WLS}) = \underset{(\hat{x}, \hat{y})}{\operatorname{argmin}} \left[ \sum_{i=N_a+1}^{N} \sum_{\substack{j \in H(i) \\ j>i}} \frac{1}{\tilde{\sigma}_{d,ij}^2} (\hat{d}_{ij} - \tilde{d}_{ij})^2 \right] \quad (6)$$

where $\hat{d}_{ij} = \sqrt{(\hat{x}_i - \hat{x}_j)^2 + (\hat{y}_i - \hat{y}_j)^2}$ ($\hat{x}_i, \hat{y}_i$ are estimates of the abscissa and ordinate of node i), $\tilde{d}_{ij}$ and $\tilde{\sigma}_{d,ij}^2$ respectively denote the estimate of the distance between nodes i and j, and the variance of the distance estimator (median, LS or ML).

Equivalently, the WLS optimization can be carried out as follows:

$$(\hat{X}^{WLS}, \hat{Y}^{WLS}) = \underset{(\hat{x}, \hat{y})}{\operatorname{argmin}} \left[ \sum_{i=1}^{N} \sum_{j=1}^{N} \frac{I_{ij}}{\tilde{\sigma}_{d,ij}^2} (\hat{d}_{ij} - \tilde{d}_{ij})^2 \right] \quad (7)$$

where $I_{ij}$ are the elements of the network adjacency matrix, defined as $I_{ij}=1$ if $j \in H(i)$ and $I_{ij}=0$ otherwise. It will be understood that the weighting performed in the WLS algorithm refers to variance terms $\tilde{\sigma}_{d,ij}^2$ in expressions (6) and (7): the largest the variance and, hence, the uncertainty of the distance estimate, the lower the weight of the corresponding quadratic error $(\hat{d}_{ij} - \tilde{d}_{ij})^2$ in the cost function.

The minimization of the expression between brackets in expression (6) or (7) can conventionally be obtained by the steepest gradient algorithm or the Gauss-Newton algorithm.

Another possible centralized algorithm for obtaining the positions of the nodes from the distance estimates is based on extended Kalman filtering (EKF). A description of this algorithm can be found in the article of C. Mensing et al. entitled "Centralized cooperative positioning and tracking with realistic communications constraints" published in Proc. WPNC '10, pp. 215-223, March 2010. Basically, the positions (and possibly the velocities) of the nodes form the state vector in the state model and the distances between nodes are the observables of the observation model.

A further possible algorithm for obtaining the positions of the nodes from the distance estimates is based on the propagation of belief messages between the nodes. This belief propagation (BP) algorithm is therefore suited to a distributed implementation. A description of a BP algorithm applied to self-localization can be found in the article of A. T. Ihler et al. entitled "Nonparametric belief propagation for self-localization of sensor networks" published in IEEE JSAC, vol. 23, No. 4, pp. 809-819, Apr. 2005. The algorithm is initialized by the distance estimates (noisy distance measurements). Each node then computes the belief (a posteriori likelihood) about its position taking into account belief messages about the same position sent by the neighboring nodes and the estimate of its position obtained at the previous iteration. It then broadcasts the new estimate of its own position together with the belief messages related to the positions of the other nodes. This cooperative localization process ideally converges after a few iterations.

Range-based positioning algorithms using RSS measurements may however perform poorly depending upon the sensitivity of the receivers equipping the nodes. Indeed, if such a receiver exhibits a limited sensitivity (i.e. a finite detection threshold if $P_{th}$ is labeled in dBm), the probability density function (conditioned on detection) of the received signal strength $P_{Rx}$ in expression (3) is not centered Gaussian anymore but is truncated below the detection threshold $P_{th}$. This truncation leads in turn to a so-called "distortion" of the probability density function of the estimation errors $\tilde{d}_{ij}-d_{ij}$ (in comparison with the one that would have been obtained with an ideal receiver with infinite sensitivity). It results that expressions (4), (4'), (4"), and (5), (5'), (5"), do not hold anymore and, therefore, that the positions estimated by the range-based positioning algorithm (e.g. by WLS optimization) is not accurate.

FIG. 2A represents the probability density functions of the received signal strength (RSS), $P_{Rx}$, respectively measured by an ideal receiver and a non-ideal receiver having a detection threshold $P_{th}$.

It will be noted that the probability density function of the received signal strength for the ideal receiver is represented by a Gaussian curve (210) whereas the one for the non-ideal receiver (220) has a similar shape but truncated below $P_{th}$. Strictly speaking, curve (220) represents a conditional probability density function (probability of the received signal strength conditioned on true detection of the signal). For the sake of understanding and for facilitating the comparison with the ideal case, the conditional probability density has not been normalized.

FIG. 2B represents the probability density functions of the estimation ranging error $\tilde{d}-d$ (the indices referring to the nodes are omitted for the sake of simplification) for an ideal receiver (230) and a non-ideal receiver (240). As above, the probability should be understood as conditioned by true detection of the signal. The normalization has also been omitted for the sake of comparison.

While the probability density function 230 is substantially Gaussian and centered under practical operating conditions, the probability density function 240 is not centered anymore. In the latter case, distance estimation is affected by a systematic bias $\mu_d = E(\tilde{d}-d) \neq 0$ where $E(\cdot)$ is the mathematical expectation.

The problem underlying the invention is therefore to propose a node positioning algorithm that provides accurate node position estimates in practical situations where real receivers with limited power sensitivity are used.

DISCLOSURE OF THE INVENTION

The present invention is defined in the appended independent claims. Various advantageous embodiments are given in the dependent claims.

BRIEF DESCRIPTION OF THE DRAWINGS

The present invention will be better understood from the description of the following embodiments, by way of illustration and in no way limitative thereto.

DETAILED DISCLOSURE OF PARTICULAR EMBODIMENTS

We will consider in the following a wireless network, for example a WSN network comprising anchor nodes (the respective positions of which are known) and regular nodes (the respective positions of which have to be determined). For example, the WSN network may comply with the IEEE 802.15.4 standard.

Each regular node is equipped with a receiver having a limited sensitivity. Without prejudice of generalization, we will assume in the following that all the receivers have the same RSS detection threshold $P_{th}$.

The idea at the basis of the invention is to correct the systematic bias and, possibly, the variance change of the distance estimators, induced by the truncation at $P_{th}$ of the probability density function of the received signal strengths, prior to deriving the node positions from the distance estimates.

Figure 3:
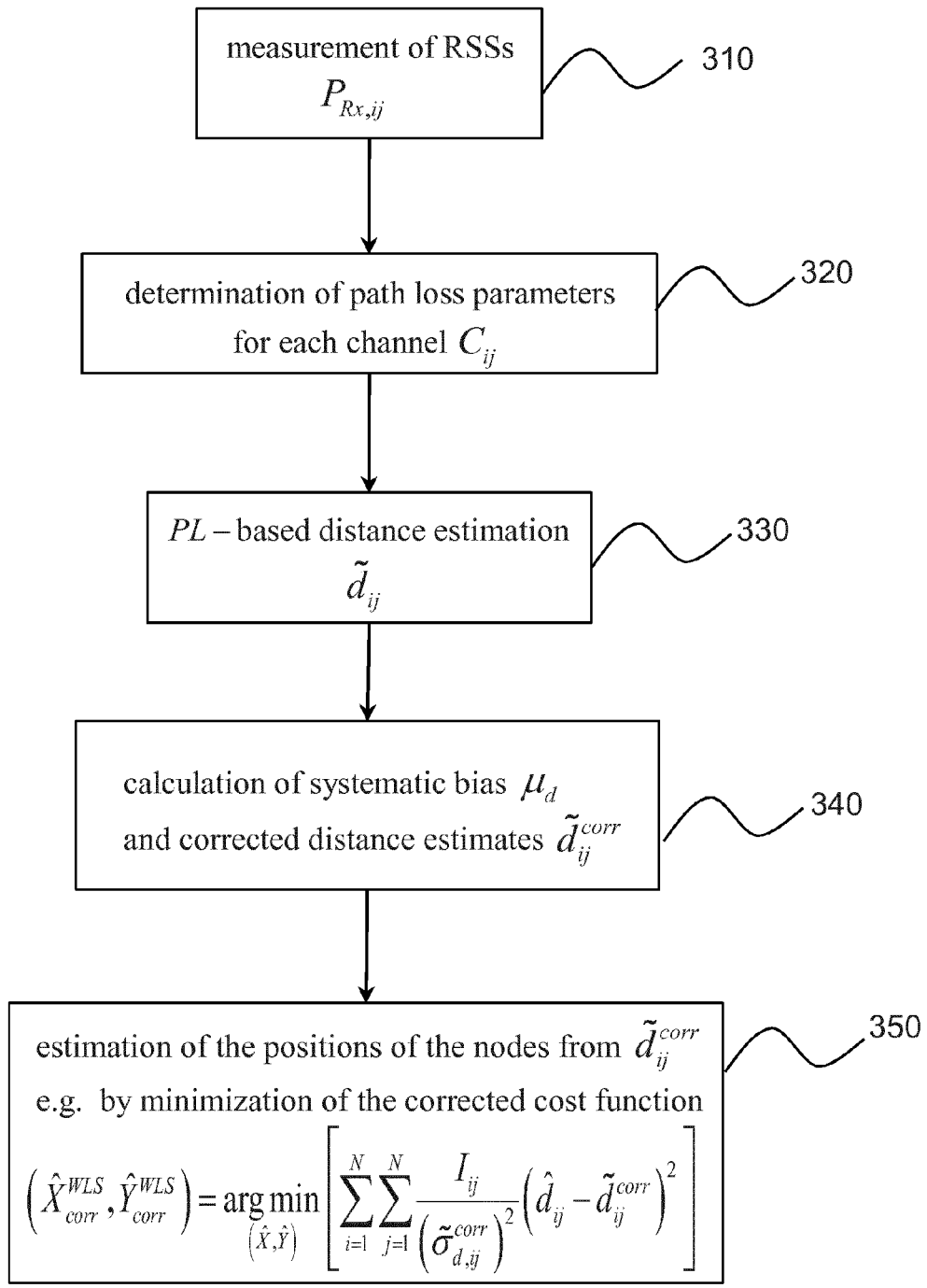
FIG. 3 schematically illustrates a method of node positioning for a wireless network according to a first embodiment of the invention.

More specifically, FIG. 3 diagrammatically illustrates a node positioning method according to an embodiment of the invention.

The node positioning method is performed after the network discovery has been completed. Preferably, the nodes are grouped into clusters and the node positioning algorithm is carried out individually on each cluster. Without loss of generality, we will assume in the following that the network contains only one cluster.

The node positioning method can be applied to a single regular node or to a plurality of regular nodes of the network. In a particular instance, the regular node can be a mobile terminal and the anchor nodes can be neighboring base stations, i.e. the mobile terminal determines its position from the strengths of the signals received from (or by) these base stations.

At step 310, each regular node i of the network measures the respective received signal strengths (RSSs) of the signals it respectively receives from its neighboring nodes j.

At step 320, path loss parameters are determined for each channel $C_{ij}$ (where at least node i or node j is a regular node, i.e. $N_a < i \leq N$ or $N_a < j \leq N$). By path loss parameters of channel $C_{ij}$, we mean here the path loss parameters of the log-normal model in (2) and (3), namely the path loss value $PL_{0,ij}$ at a reference distance, the path loss decay exponent $\alpha_{ij}$ and the shadowing coefficient $\sigma_{z,ij}^2$. If the reference distance depends upon the category of the channel considered (for example LOS or NLOS), the reference distance also belongs the set of path loss parameters.

Path loss parameters can be determined in various ways. For example, these parameters may be obtained by classifying the channel into one of predetermined channel categories, each channel category (e.g. LOS, NLOS, NLOS with deep attenuation) being associated with a set of standard path loss parameters. These standard path loss parameters may have been obtained by previous data collecting campaigns and statistical data analysis.

At step 330, distance estimates $\tilde{d}_{ij}$ are calculated from the received signal strengths measured at step 310 and the path loss parameters of channel $C_{ij}$ previously determined.

In such instance, the estimate $\tilde{d}_{ij}$ of the distance between nodes i and j, can be given by the median estimator as follows:

$$\tilde{d}_{ij}^{med} = \exp(M_{ij}) \quad (8)$$

where $$M_{ij} = \frac{([P_{Tx} + G_{Rx} + G_{Tx} - P_{Rx,ij}] - PL_{0,ij})\log(10)}{10\alpha_{ij}} + \log(d_{0,ij}) \quad (9)$$

and where $P_{Rx,ij}$ is the RSS of the signal received by node from node j, $PL_{0,ij}$ is the path loss data at reference distance $d_{0,ij}$ (indexation by ij accounts here for the case where different reference distances are used for different channels). Alternatively, the distance estimate may be obtained by mean estimator (5') or mode estimator (5").

By contrast with the prior art, the distance estimates are corrected at step 340. More specifically, this step determines the systematic biases on the distance estimates introduced by the sensitivity limitation, and, optionally, the corrected variance terms of the distance estimators.

Figure 1:
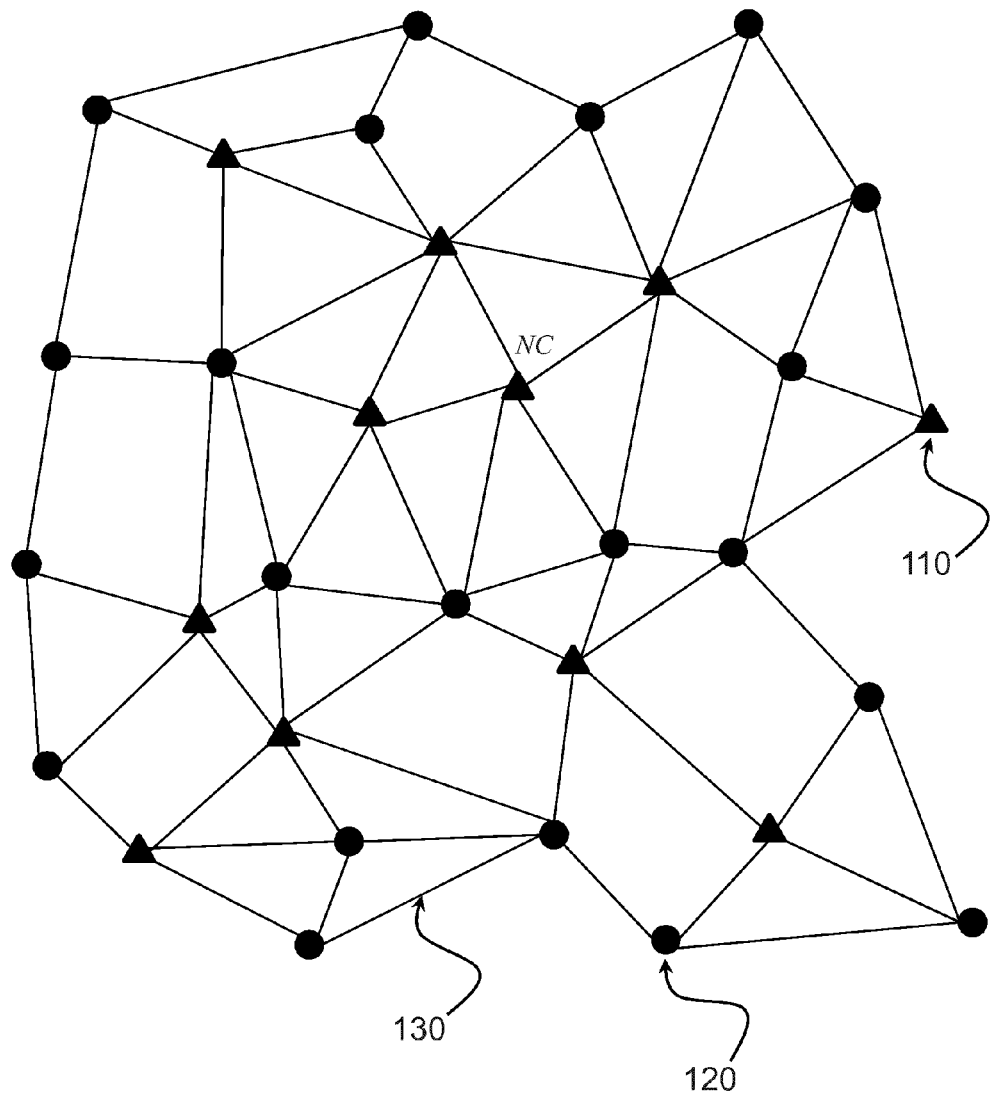
FIG. 1 schematically illustrates a wireless sensor network having anchor nodes and regular nodes.
Figure 2A:
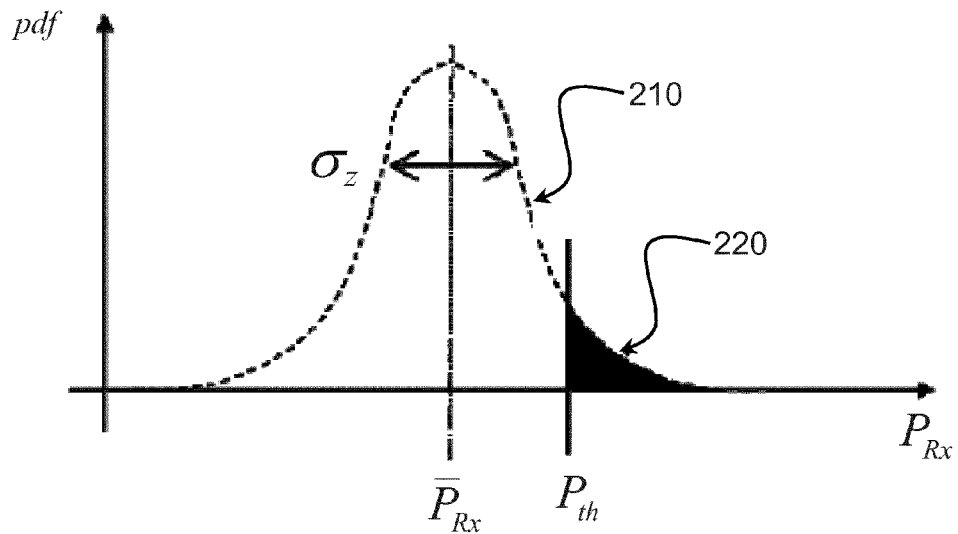
FIG. 2A schematically represents the probability distributions of the received signal strength for an ideal and anon-ideal receiver.
Figure 2B:
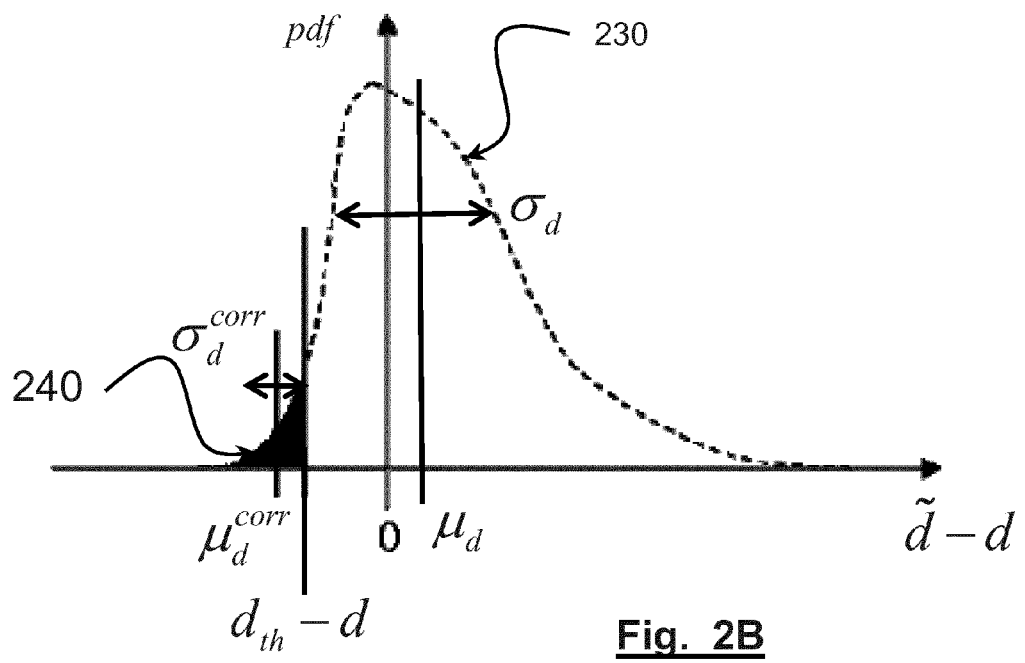
FIG. 2B schematically represents the probability distributions of the distance estimate error for an ideal and a non-ideal receiver.

As already explained in relation with FIGS. 2A and 2B, the truncation of the probability density function (pdf) of the received signal strength $P_{Rx,ij}$ (i.e. this function is null below $P_{th}$) leads to a so-called "distortion" of the pdf of the distance estimate that would have been obtained with an ideal receiver with infinite sensitivity ($P_{th}=-\infty$ in dB). This distortion can be assessed and captured by the changes affecting moments of the distance estimate pdf.

Importantly, it has been shown that the moments of the distance estimate pdf conditioned on power detection (e.g. 240 in FIG. 2B) are a function of the actual distance value d, the RSS threshold $P_{th}$ and the path loss parameters.

If the pdf of the RSS is truncated below $P_{th}$, the pdf of the distance estimator is truncated (in comparison with the density that would have been obtained without power threshold) and restricted below a corresponding distance $d_{th}$. It follows that the distance estimator is affected by a systematic bias $\mu_d = E_z(\tilde{d}-d)$ where the expected value is taken here over z (see expression (3)).

The systematic bias can be calculated as:

$$\mu_d = \frac{1}{Pr_{det}} \int_{P_{th}-\overline{P}_{Rx}}^{+\infty} (\tilde{d}-d) pdf(z) dz \quad (10)$$

where $Pr_{det}$ is the detection rate of the received signal i.e. the probability that the signal strength at the receiver is higher than $P_{th}$:

$$Pr_{det} = \int_{P_{th}}^{+\infty} pdf(P_{Rx}) dP_{Rx} = \frac{1}{2} \text{erfc}\left(\frac{P_{th}-\overline{P}_{Rx}}{\sqrt{2}\,\sigma_z}\right) \quad (11)$$

where $\overline{P}_{Rx}$ is the mean received power and $\text{erfc}(\cdot)$ is the complementary error function.

Similarly the variance the distance estimator for the truncated pdf, denoted $(\sigma_d^{corr})^2$, can be calculated as:

$$(\sigma_d^{corr})^2 = \frac{1}{Pr_{det}} \int_{P_{th}-\overline{P}_{Rx}}^{+\infty} (\tilde{d}-d)^2 pdf(z) dz - \mu_d^2 \quad (12)$$

For the sake of simplicity, the results will be given below for the median distance estimator only. The man skilled in the art will nevertheless understand that similar results can be obtained for the above-mentioned mean and mode distance estimators.

It is recalled that $\tilde{d}^{med}=\exp(M)$ where $$M = \frac{([P_{Tx}+G_{Rx}+G_{Tx}-P_{Rx}]-PL_0)\log(10)}{10\alpha} + \log(d_0).$$

Replacing this expression into (10), it can be shown that the systematic bias of the distance estimator can be expressed as:

$$\mu_d = d\left[\frac{1}{2\sqrt{2A}\,\sigma_z Pr_{det}} \exp\left(\frac{B^2-4AC}{4A}\right) \text{erfc}\left(\frac{B}{2\sqrt{A}}\right) - 1\right] \quad (13)$$

with $$A = \frac{1}{2\sigma_z^2},$$

$$B = \frac{\ln(10)}{10\alpha} + \frac{P_{th}-\overline{P}_{Rx}}{\sigma_z^2},$$

and $$C = (P_{th}-\overline{P}_{Rx})\left(\frac{\ln(10)}{10\alpha} + \frac{P_{th}-\overline{P}_{Rx}}{2\sigma_z^2}\right),$$

Similarly, the variance can be expressed as:

$$(\sigma_d^{corr})^2 = \quad (14)$$
$$d^2\left[\frac{1}{2\sqrt{A'}\,\sigma_z Pr_{det}} \exp\left(\frac{B'^2-4A'C'}{4A'}\right) \text{erfc}\left(\frac{B'}{2\sqrt{A'}}\right) - 2\left(\frac{\mu_d}{d}\right) - 1\right] - \mu_d^2$$

with $$A' = A,$$

$$B' = \frac{\ln(10)}{5\alpha} + \frac{P_{th}-\overline{P}_{Rx}}{\sigma_z^2},$$

$$C' = (P_{th}-\overline{P}_{Rx})\left(\frac{\ln(10)}{5\alpha} + \frac{P_{th}-\overline{P}_{Rx}}{2\sigma_z^2}\right)$$

Expressions (13) and (14) are parametric functions of distance d, the detection threshold $P_{th}$, and the path loss parameters.

It has been shown that the bias $\mu_d$ can be neglected when the distance is below a distance $d_{min}$ (related to the reference distance $d_0$) and then approximately behaves linearly. $\chi(d)$ denotes this piecewise linear function.

As for the corrected variance $(\sigma_d^{corr})^2$, it can be approximated by a quadratic function $\phi(d)=\omega(d^2)$, where $\omega(\cdot)$ is a linear function, below a distance $d_{max}$ (also related to the reference distance $d_0$).

The functions $\chi$ and $\phi$ are parameterized by the RSS threshold, $P_{th}$, and log-normal RSS model parameters (i.e. path loss parameters and shadowing coefficient). They can be fitted to the (13) and (14) in a conventional way (e.g. according to a minimum least squares criterion) and stored either as analytical expressions or as look up tables.

At step 350, the positions of the regular nodes are estimated from the estimated distances corrected at step 340.

Various range-based positioning algorithms can be used for this purpose, either in a centralized way (the calculations being performed by a dedicated node or possibly an external server) or in a distributed way. For example the positions can be obtained by cooperative EKF filtering, belief propagation (BP) or WLS optimization. Other range-positioning algorithms can be envisaged by the man skilled in the art while staying within the scope of the claims.

In FIG. 3, the example of WLS optimization has been represented. The positions of the nodes are estimated by minimizing the corrected cost function:

$$\left(\hat{X}_{corr}^{WLS}, \hat{Y}_{corr}^{WLS}\right) = \underset{(\hat{x},\hat{y})}{\operatorname{argmin}} \left[ \sum_{i=1}^{N} \sum_{j=1}^{N} \frac{I_{ij}}{(\tilde{\sigma}_{d,ij}^{corr})^2} (\hat{d}_{ij} - \tilde{d}_{ij}^{corr})^2 \right] \quad (15)$$

where corrected values $\tilde{d}_{ij}^{corr} = \tilde{d}_{ij} - \mu_{d,ij}^{corr}$ and $\tilde{\sigma}_{d,ij}^{corr}$ have been used instead of $\tilde{d}_{ij}$ and $\tilde{\sigma}_{d,ij}$ in expression (8).

It should be understood that only the terms $(\hat{d}_{ij} - \tilde{d}_{ij}^{corr})^2$ for which $I_{ij}=1$ need to be calculated in (15), i.e. only the terms for which at least node i or node j is a regular node and $P_{Rx,ij} < P_{th}$ (true detection). Where one of these nodes is an anchor node, its coordinates $\hat{x}_i$, $\hat{y}_i$ are those which are already known.

The WLS solution, $(\hat{X}_{corr}^{WLS}, \hat{Y}_{corr}^{WLS})$ provides accurate estimates of the abscissas and ordinates of the regular nodes. More specifically, the elements $\hat{x}_{corr,i}^{WLS}$ of $\hat{X}_{corr}^{WLS}$, resp. the elements $\hat{y}_{corr,i}^{WLS}$ of $\hat{Y}_{corr}^{WLS}$, are estimates of the corr abscissas, resp. ordinates of these nodes.

It should be noted that minimization of the quadratic cost function (15) can be achieved in different ways e.g. by using the algorithm of steepest descent or the Gauss-Newton algorithm. This algorithm can be initialized by an initial guess of the coordinates of the regular nodes. Advantageously, a range-free node positioning method such as the above-mentioned DV-hop may provide this initial guess.

Figure 4:
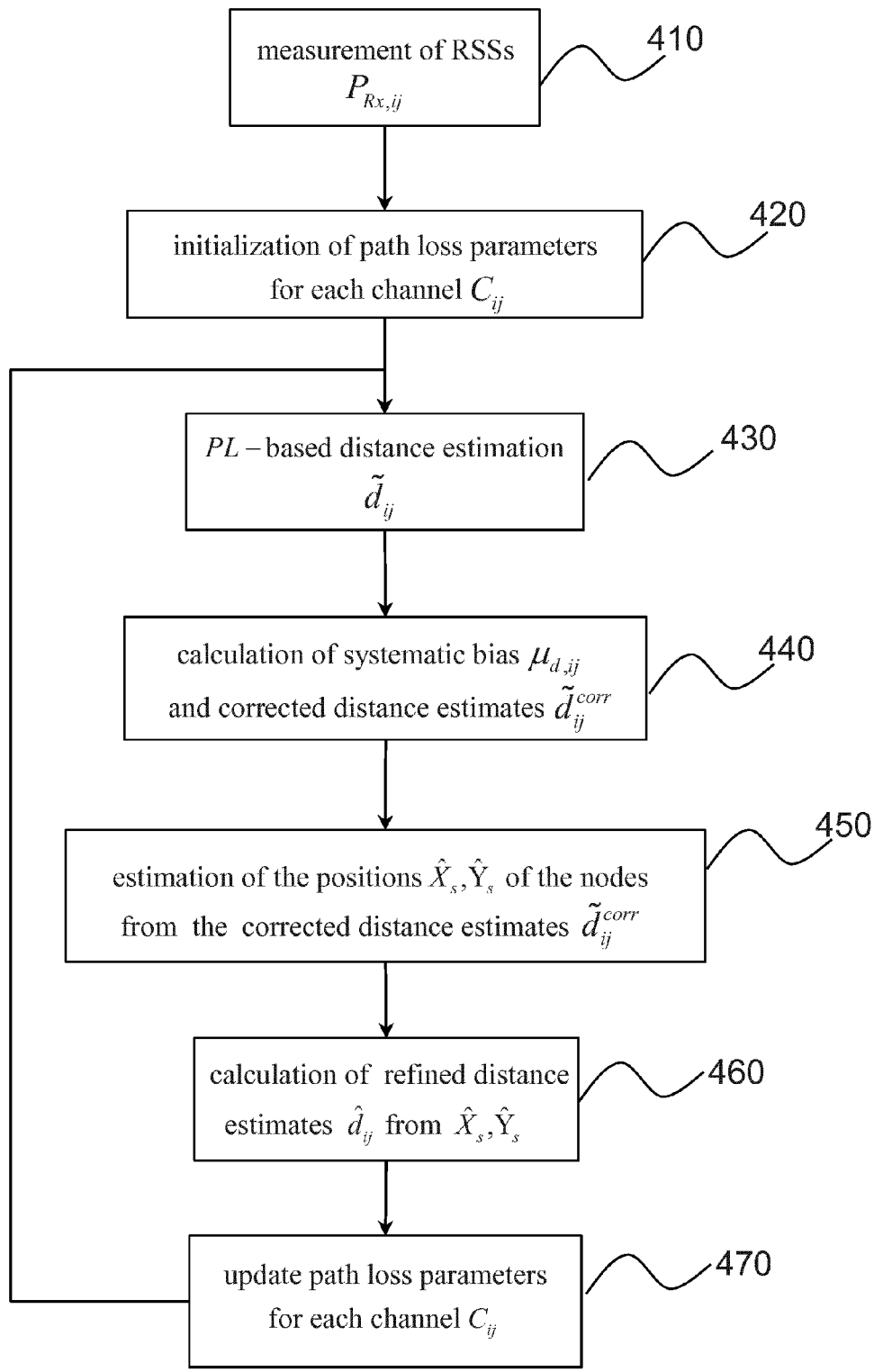
FIG. 4 schematically illustrates a method of node positioning for a wireless network according to a second embodiment of the invention.

FIG. 4 schematically illustrates a node positioning method according to a second embodiment of the invention.

By contrast with the first embodiment, no prior knowledge of the path loss parameters of the channels is assumed. More precisely, the present embodiment allows for a blind estimation of the path loss parameters of at least some of the channels.

Steps 410, 430-450 are respectively identical to steps 310, 330-350 of FIG. 3 and therefore their description will not be repeated. Again, WLS optimization has been taken as illustrative example in step 450 but other algorithms may equally be considered.

At step 420, the path loss parameters of each channel $C_{ij}$ (where at least node i or node j is a regular node) are initialized at given values. These values are for example those of a LOS (line-of-sight) channel.

After steps 430 to 460 have been completed, refined estimates of the distances between each node and their neighboring nodes can be obtained.

In the illustrated example, these refined estimates are calculated at step 460 from the WLS optimized positions of the regular nodes:

$$\hat{d}_{ij}^{WLS} = \sqrt{(\hat{x}_i^{WLS} - \hat{x}_j^{WLS})^2 + (\hat{y}_i^{WLS} - \hat{y}_j^{WLS})^2} \quad (16)$$

where it will be understood that, if i or j is an anchor node, its coordinates in (16) refer to its known coordinates and not to estimated ones.

Once refined distances $\hat{d}_{ij}^{WLS}$ have been obtained, the path loss parameters of channels $C_{ij}$ (or at least those which are not known) are updated at step 470.

It is assumed that path loss parameters $PL_{0,ij}$, $\alpha_{ij}$ and $d_{0,ij}$ (and possibly the shadowing coefficients $\sigma_{z,ij}^2$) may take discrete values according to the category channel $C_{ij}$. For example the different channel categories can be line of sight (LOS), non line of sight (NLOS), non line of sight with deep attenuation ($NLOS^2$). Assuming that there are K such channel categories, the channel parameters belonging to the $k^{th}$ category, namely the path loss parameters $PL_0^{(k)}$, $\alpha^{(k)}$, $d_0^{(k)}$ and, possibly, the shadowing coefficient $(\sigma_z^{(k)})^2$, can be optimized by collecting information (i.e. location estimates and RSS measurements) for all the links where the channel configuration is known (or a priori identified according to any channel identification strategy) to belong to the above mentioned category (i.e. $\hat{C}_{ij}=k$):

$$\left(\hat{PL}_0^{(k)}, \hat{\alpha}^{(k)}, \hat{d}_0^{(k)}\right) = \underset{PL_0^{(k)}, \alpha^{(k)}, d_0^{(k)}}{\operatorname{argmin}} \quad (17)$$

$$\sum_{i=1}^{N}\sum_{j=1}^{N} I_{ij}\left(\left[P_{Tx} + G_{Tx} + G_{Rx} - PL_0^{(k)} - 10\alpha^{(k)}\log_{10}\left(\hat{d}_{ij}^{WLS}/d_0^{(k)}\right)\right] - P_{Rx,ij}\right)^2$$

where $I_{ij}=1$ if $\hat{C}_{ij}=k$ and $P_{Rx,ij} > P_{th}$, and where $P_{Tx}$, $G_{Tx}$, $G_{Rx}$ are assumed to be known by (or forwarded to) the node in charge of the calculation.

The variance of the obtained optimization residuals can advantageously be used as the shadowing coefficient (i.e. still keeping the Gaussian centered shadowing assumption).

When no prior channel identification step is performed, the channel parameters of each category and the channel configuration per link can be jointly optimized, e.g. as follows:

$$\left(\{\hat{PL}_0^{(k)}\}_{k=1...K}, \{\hat{\alpha}^{(k)}\}_{k=1...K}, \{\hat{d}_0^{(k)}\}_{k=1...K}, \{\hat{C}_{ij}\}_{i=1...N,j=1...N}\right) = \quad (17')$$

$$\underset{\substack{\{PL_0^{(k)}\},\{\alpha^{(k)}\},\{d_0^{(k)}\} \\ \{C_{ij}\in\{1...K\}\}}}{\operatorname{argmin}} \sum_{i=1}^{N}\sum_{j=1}^{N} I_{ij}\left(\left[P_{Tx} + G_{Tx} + G_{Rx} - PL_0^{(C_{ij})} - 10\alpha^{(C_{ij})}\log_{10}\left(\hat{d}_{ij}^{WLS}/d_0^{(C_{ij})}\right)\right] - P_{Rx,ij}\right)^2$$

The node positioning method then proceeds by going back to step 430 where new estimates $\tilde{d}_{ij}$ are obtained from RSS measurements $P_{Rx,ij}$ and the path loss parameters thus updated.

It will be understood that steps 430 to 470 can be iterated, refined node positions estimates leading to more accurate path loss parameters and vice-versa.

The iterations are stopped when a predetermined stopping criterion is met, for example when a predetermined maximum number of iterations is reached. Alternately, this criterion can be labeled in terms a minimal distance between consecutive node position estimates and/or minimal absolute difference between consecutive estimates of path loss parameters.

If the range-based positioning algorithm involved at step 450 is itself iterative (WLS with gradient descent or EKF filtering), each current iteration n thereof provides position estimates denoted $X^{(n)}$ (for the vector of abscissas) and $Y^{(n)}$ (for the vector of ordinates).

According to one variant of the present embodiment, the estimated distances computed out of $X^{(n)}$ and $Y^{(n)}$ at current iteration n in 450, namely $$\hat{d}_{ij}^{(n)} = \sqrt{(\hat{x}_i^{(n)} - \hat{x}_j^{(n)})^2 + (\hat{y}_i^{(n)} - \hat{y}_j^{(n)})^2} \quad (18)$$

where and $\hat{x}_i^{(n)}$ and $\hat{y}_i^{(n)}$ are respectively the components of $X^{(n)}$ and $Y^{(n)}$, can be used to adaptively update the correcting factors $\mu_{d,ij}^{corr(n)} = \chi(\hat{d}_{ij}^{(n)})$ and $\tilde{\sigma}_{d,ij}^{corr(n)} = \phi(\hat{d}_{ij}^{(n)})$ within the same iteration n.

According to a further variant of the present embodiment, the path loss parameters are not updated at the end of step 450 (e.g. on the basis on the final solution $(\hat{X}_{corr}^{WLS}, \hat{Y}_{corr}^{WLS})$ of step 450) but after each and every iteration within 450.

More specifically, the distance estimates $\hat{d}_{ij}^{(n)} = \sqrt{(\hat{x}_i^{(n)} - \hat{x}_j^{(n)})^2 + (\hat{y}_i^{(n)} - \hat{y}_j^{(n)})^2}$ at the current iteration n in 450 are used for updating the path loss parameters as in 470, calculating new distances $\tilde{d}_{ij}$ as in 430 and correcting these distances as per 440 (corrected shadowing coefficients $(\sigma_{d,ij}^{corr})^2$ can also be recalculated at this stage), before performing the next iteration.

Whatever the embodiment, the node positioning method described above can be carried out in a centralized way (for instance at the network controller) or in a distributed way.

In a centralized implementation, the RSS measurements $P_{Rx,ij}$ or, alternately, the distance estimates $\tilde{d}_{ij}$ are forwarded to the network controller (or to an external server) in charge of the WLS optimization.

In a distributed implementation, each regular node receive the RSS measurements $P_{Rx,ij}$ from its neighbors (also possibly the self-estimated positions of its neighbors) and will perform positioning on its own.

In a further implementation, the node positioning method can be carried out in a semi-distributed or hierarchical way. For example if the network can be partitioned into clusters of nodes, the positioning method can be locally carried by a node of the cluster (e.g. a cluster controller). For instance, in a hierarchical method, the network controller could be in charge of estimating the positions of the cluster controllers, whereas each cluster controller could be in charge of positioning the nodes in its cluster.

The invention claimed is:

1. A node positioning method for a wireless network, the network including nodes whose positions are known, as anchor nodes, and nodes whose positions have to be determined, as regular nodes, the method comprising:
   (a) measuring, by a receiver for each node, signal strengths of signals received from its neighboring nodes;
   (b) obtaining path loss parameters of channels respectively linking each regular node to its neighboring nodes;
   (c) estimating distances separating each regular node from its neighboring nodes on the basis of the measured signal strengths and the path loss parameters thus obtained; and
   (d) each distance thus estimated, separating a regular node from a neighboring node, is corrected for a systematic bias depending upon a detection threshold of the receiver and the path loss parameters of the channel linking the regular node and the neighboring node, thereby providing corrected distance estimates;
   (e) estimating the positions of the regular nodes on the basis of the corrected distance estimates obtained at (d).

2. A node positioning method according to claim 1, wherein the positions of the regular nodes are estimated in (e) by minimizing a cost function depending upon weighted quadratic differences between the distances separating each regular node from its neighboring nodes, and corresponding estimated distances corrected at (d), the weights being inversely proportional to variances of the distance estimates.

3. A node positioning method according to claim 2, wherein, (d) further calculates respective variances of the distance estimates on the basis of the measured signal strengths, the path loss parameters, and the detection threshold.

4. A node positioning method according to claim 1, wherein the path loss parameters of each channel include a path loss value at a reference distance, a path loss decay exponent, and a shadowing coefficient.

5. A node positioning method according to claim 4, wherein the path loss value, path loss decay exponent, and shadowing coefficient are determined in (b) according to a category of the channel, the channel categories being of line of sight, non line of sight, and non light of sight with deep attenuation.

6. A node positioning method according to claim 1, further comprising:
   (f) calculating refined distance estimates on basis of the positions of the regular nodes estimated at (e);
   (g) using the refined distance estimates to obtain, for each channel, updated path loss parameters.

7. A node positioning method according to claim 6, wherein the path loss parameters having been initialized at predetermined values in (b), the updated path loss parameters obtained at (g) are used in (c) for obtaining new estimates of the distances between each regular node and its neighboring nodes.

8. A node positioning algorithm according to claim 7, wherein the sequence (c), (d), (e), (f) and (g) is iterated until a predetermined stopping criterion is met.

9. A node positioning method according to claim 1, wherein the cost function is minimized in (e) by a steepest descent algorithm, the node positions being first initialized by coarse node positions supplied by a range-free positioning algorithm.

10. A node positioning method according to claim 1, wherein (e) includes an iterative process comprising a plurality of iterations, each iteration providing current position estimates of the regular nodes and, at each iteration,
    refined distance estimates are calculated on basis of the current position estimates of the regular nodes;
    the refined estimates are used to obtain, for each channel, updated path loss parameters;
    (c) and (d) are carried out on the basis of the updated path loss parameters to provide new corrected distance estimates, a following iteration of (e) taking into account the new corrected distance estimates.

11. A node positioning method according to claim 1, wherein (e) includes an iterative process comprising a plurality of iterations, each iteration providing current position estimates of the regular nodes and, at each iteration,
    refined distance estimates are calculated on basis of the current position estimates of the regular nodes;
    each refined distance estimate, separating a regular node from a neighboring node, is used to update the systematic bias for the next iteration in (e).

* * * * *